US005193007A

United States Patent [19]

Yokoyama et al.

[11] Patent Number: 5,193,007

[45] Date of Patent: Mar. 9, 1993

[54] THERMAL TRANSFER RECORDING APPARATUS AND METHOD OF USE WITH PARTICULAR RELATIONSHIP BETWEEN RELATIVE CONVEYANCE DIRECTION, LENGTH, AND VELOCITY OF THE INK SHEET, RECORDING MEDIUM, AND IMAGE RECORDING

[75] Inventors: Minoru Yokoyama; Takashi Awai; Akihiro Tomoda, all of Yokohama; Yasushi Ishida, Tokyo; Hisao Terajima; Takeshi Ono, both of Yokohama; Takehiro Yoshida, Tokyo; Satoshi Wada, Kawasaki; Makoto Kobayashi, Iama, all of Japan

[73] Assignee: Canon Kabushiki Kaisha, Tokyo, Japan

[21] Appl. No.: 409,777

[22] Filed: Sep. 20, 1989

[30] Foreign Application Priority Data

Sep. 22, 1988 [JP] Japan ................................ 63-236365

[51] Int. Cl.[5] ...................... H04N 1/23; G01D 15/10; B41J 2/325; B41J 33/36; B41J 33/40

[52] U.S. Cl. ............................... 358/296; 346/76 PH; 346/1.1; 400/120; 400/224.2

[58] Field of Search .................. 346/76 PH, 134, 136, 346/1.1; 358/296; 400/224.2, 230, 120, 185

[56] References Cited

U.S. PATENT DOCUMENTS

| | | |
|---|---|---|
| 4,342,052 | 7/1982 | Rackley et al. . |
| 4,505,603 | 3/1985 | Yana . |
| 4,531,135 | 7/1985 | Toshima . |
| 4,577,199 | 3/1986 | Saiki et al. . |
| 4,623,902 | 11/1986 | Yamanishi . |
| 4,771,296 | 9/1988 | Shimada et al. . |

FOREIGN PATENT DOCUMENTS

| | | |
|---|---|---|
| 201686 | 11/1983 | Japan . |
| 95177 | 6/1984 | Japan . |
| 61-135773 | 6/1986 | Japan . |
| 62-181168 | 8/1987 | Japan . |
| 165169 | 7/1988 | Japan . |
| 21479 | 1/1991 | Japan . |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

A heat transfer recording method of transferring the ink of an ink sheet to a recording medium to thereby effect recording of an image on the recording medium is characterized in that the ink sheet is conveyed in the direction opposite to the conveyance direction of the recording medium and recording of an image is effected on the recording medium.

31 Claims, 12 Drawing Sheets

THERMAL TRANSFER RECORDING APPARATUS AND METHOD OF USE WITH PARTICULAR RELATIONSHIP BETWEEN RELATIVE CONVEYANCE DIRECTION, LENGTH, AND VELOCITY OF THE INK SHEET, RECORDING MEDIUM, AND IMAGE RECORDING

BACKGROUND OF THE INVENTION

1. Field of the Invention

This invention relates to a heat transfer recording method and apparatus for transferring the ink of an ink sheet to a recording medium to thereby accomplish image recording on the recording medium.

The term "heat transfer recording apparatus" covers, for example, a facsimile apparatus, an electronic typewriter, a copying apparatus, a printer apparatus, etc.

2. Related Background Art

Generally, in a heat transfer printer, use is made of an ink sheet having heat-meltable (or heat-sublimating) ink applied to a base film, and the ink sheet is selectively heated by a thermal head correspondingly to an image signal and the melted (or sublimated) ink is transferred to recording paper to thereby accomplish image recording. Generally such ink sheet is one from which the ink is completely transferred to the recording paper by one time of image recording (so-called one time sheet) and therefore, it has been necessary that after the termination of recording of one character or one line, the ink sheet be conveyed by an amount corresponding to the length of the record and then the unused portion of the ink sheet be reliably brought to the position for recording. Therefore, the quantity of ink sheets used is increased and as compared with an ordinary thermosensitive printer for recording on thermosensitive paper, the running cost of the heat transfer printer tends to become high.

In order to solve such a problem, there have been proposed heat transfer printers wherein recording paper and an ink sheet are conveyed with a speed difference therebetween as seen in U.S. Pat. No. 4,456,392, Japanese Laid-Open Patent Application No. 58-201686, Japanese Patent Publication No. 62-58917. As described in these publications, an ink sheet capable of effecting plural times of image recording (so-called multiprint sheet) is known, and if such ink sheet is used, when a record length L is to be continuously recorded, the conveyed length of the ink sheet conveyed after or during each recording cycle can be made smaller than the length L ($L/n$:$n>1$) to thereby accomplish recording. Thus, the use efficiency of the ink sheet becomes n times as great as that before and a reduction in the running cost of a heat transfer printer can be expected. This recording system will hereinafter be referred to as multiprint.

However, in the multiprint using such an ink sheet, as in the conventional heat transfer printer, as seen in the aforementioned publications, the conveying directions of the recording paper and the ink sheet have been the same. This relation, if expressed in a mathematic expression, is $V_P = n \cdot V_I$, where $V_P$ represents the velocity of the recording paper relative to the thermal head, and $V_I$ represents the velocity of the ink sheet relative to the thermal head.

In contrast, as a result of our experiment, we have found that a higher relative velocity of the recording paper and the ink sheet is more advantageous when multiprint is carried out in the heat transfer system. This will hereinafter be described.

In the conventional heat transfer system, it has been necessary that the ink of the ink sheet be completely peeled from the base film by one cycle of heating, while in the multiprint system, the ink is recorded by n cycles of heating and therefore it is necessary that approximately 1/n of the ink layer be separated and transfer-recorded by one cycle of heating. On the other hand, the ink layer in the ink sheet is, for example, heat-meltable and therefore if the time from after the ink sheet is heated by the thermal head until the ink layer is peeled becomes long, the shearing force required to shear and separate the ink layer will become great. Therefore, if the time from after the thermal head is heated until the ink is transferred becomes long, it will become difficult to separate the ink layer properly (the unit of 1/n) and transfer it to the recording paper. Thus, unless the relative velocity of the recording paper and the ink sheet is high to a certain degree, the ink layer in the ink sheet cannot be separated well.

The conventional relative velocity $V_{PI}$ of the recording paper and the ink sheet, if $V_P = n \cdot V_I$, is $$V_{PI} = V_P - V_I = V_P - V_P/n = (1-1/n)V_P \quad (1)$$

and when the ink sheet is at rest, the relative velocity $V_{PI}$ becomes equal to $V_P$, but the relative velocity $V_{PI}$ when the ink sheet is moved cannot become higher than the conveyance velocity $V_P$ of the recording paper. Also, the above-mentioned equation shows that the conveyance velocity $V_P$ of the recording paper cannot be made very high, for example, a sufficient relative velocity cannot be obtained in the case of a line printer or the like, and when the conveyance velocity $V_P$ of the recording paper is small, there has been the tendency that separation of the ink in the ink sheet cannot be accomplished well and the recording paper is pulled by the conveyance velocity of the ink sheet or the conveyance velocity of the ink sheet is pulled by the conveyance velocity of the recording paper.

SUMMARY OF THE INVENTION

It is an object of the present invention to provide a heat transfer recording method which can improve the quality of images and a recording apparatus using such method.

It is another object of the present invention to provide a heat transfer recording method which can decrease the quantity of ink sheets consumed and a recording apparatus using such method.

It is still another object of the present invention to provide a heat transfer recording method which can reduce the running cost and a recording apparatus using such method.

It is yet still another object of the present invention to provide a heat transfer recording method in which the conveying directions of a recording medium and an ink sheet are opposed to each other to thereby make the relative velocity of the recording medium and the ink sheet great and improve the quality of recorded images in multiprint and an apparatus using such method.

It is a further object of the present invention to provide a facsimile apparatus using a heat transfer recording method which reduces the running cost.

It is still a further object of the present invention to provide a heat transfer recording method which can reliably separate an ink sheet and a recording medium from each other and a recording apparatus using such method.

DESCRIPTION OF THE PREFERRED EMBODIMENTS

Some preferred embodiments of the present invention will hereinafter be described in detail with reference to the accompanying drawings.

Description of Facsimile Apparatus (FIGS. 1–4)

Figure 2:
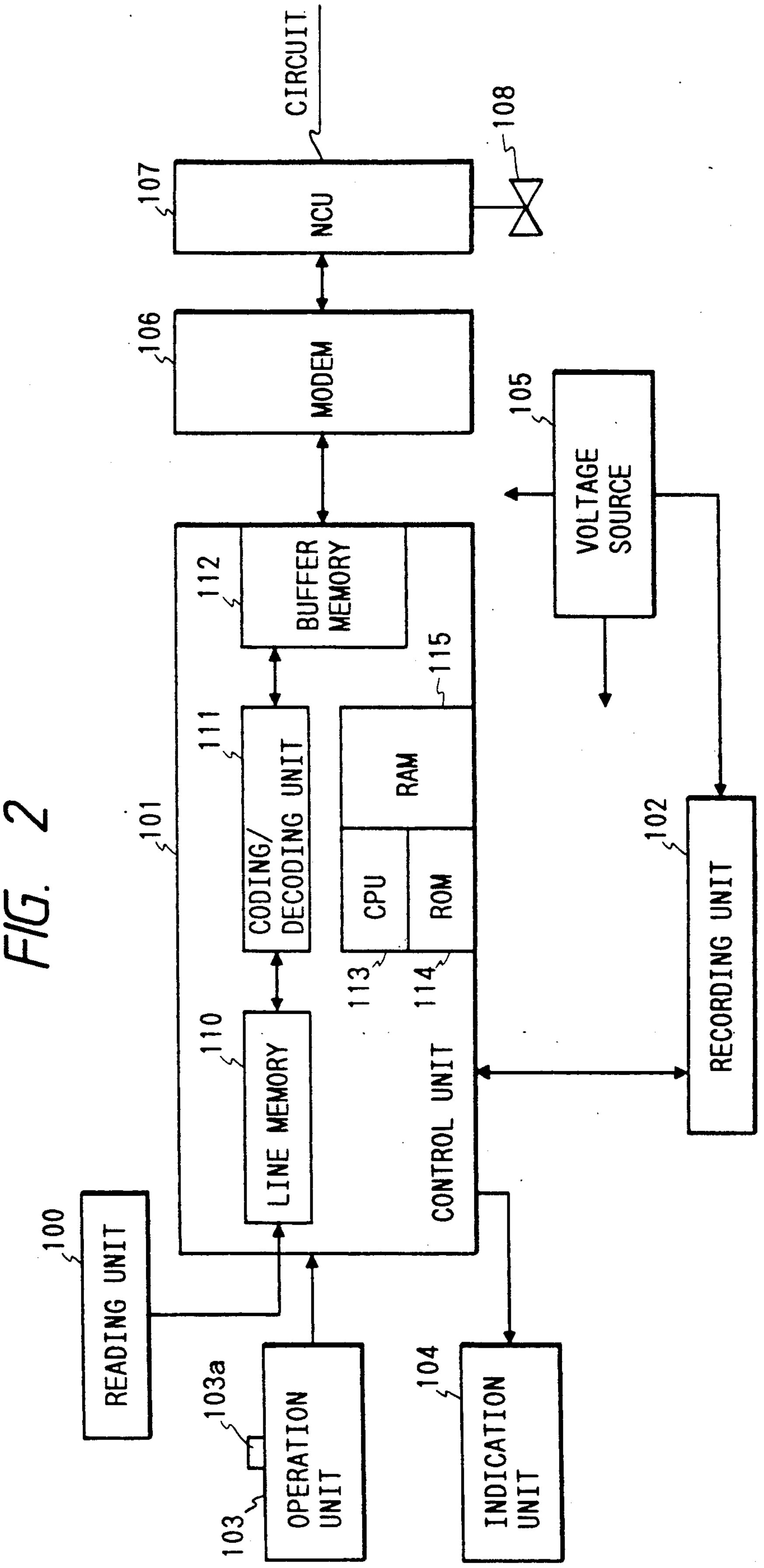
FIG. 2 is a block diagram schematically showing the construction of a facsimile apparatus to which an embodiment of the present invention is applied.

FIGS. 1 to 4 show an example in which a heat transfer printer using an embodiment of the present invention is applied to a facsimile apparatus. FIG. 1A is a side cross-sectional view of the facsimile apparatus, FIG. 1B is a pictorial perspective view thereof, and FIG. 2 is a block diagram schematically showing the construction of the facsimile apparatus.

The construction will first be schematically described with reference to FIG. 2.

In FIG. 2, the reference numeral 100 designates a reading unit for photoelectrically reading an original and outputting it as a digital image signal to a control unit 101. The reading unit 100 is provided with an original conveying motor, a CCD image sensor, etc. The construction of the control unit 101 will now be described. The reference numeral 110 denotes a line memory for storing the image data of each line therein. During the transmission or copying of an original, the image data of one line from the reading unit 100 is stored in the line memory 110, and during the reception of image data, one line data of the decoded received image data is stored in the line memory 110. By the stored data being output to a recording unit 102, image formation is accomplished. The reference numeral 111 designates a coding/decoding unit for coding the transmitted image information as by MH coding and decoding the received coded image data and converting it into image data. The reference numeral 112 denotes a buffer memory for storing the transmitted or received coded image data therein. These various portions of the control unit 101 are controlled by a CPU 113 such as a microprocessor. Besides this CPU 113, the control unit 101 is provided with an ROM 114 storing therein the control program of the CPU 113 and various data, and a RAM 115 for temporarily preserving various data as the work area of the CPU 113.

The reference numeral 102 designates a recording unit which is provided with a thermal line head and which effects image recording on recording paper by a heat transfer recording method. The construction of this recording unit will be described later in detail with reference to FIG. 1. The reference numeral 103 denotes an operation unit including instruction keys for various functions such as the starting of transmission, a telephone number input key, etc., and the reference character 103*a* designates a switch for indicating the kind of the ink sheet 14 used, and when the switch 103*a* is ON, it indicates that an ink sheet for multiprint has been mounted, and when the switch 103*a* is OFF, it indicates that an ordinary ink sheet has been mounted. The reference numeral 104 denotes an indication unit for usually indicating various functions provided in the operation unit 103, the state of the apparatus, etc. The reference numeral 105 designates a voltage source unit for supplying electric power to the entire apparatus. The reference numeral 106 denotes a modemodulator, the reference numeral 107 designates a net control unit (NCU). and the reference numeral 108 denotes a telephone set.

The construction of the recording unit will now be described in detail with reference to FIG. 1. In FIG. 1, portions common to those in FIG. 2 are designated by similar reference characters.

In FIG. 1, the reference numeral 10 designates a roll of paper comprising recording paper 11 which is plain paper wound into the form of a roll on a core 10*a*. This roll of paper 10 is rotatably contained in the apparatus so that the recording paper 11 can be supplied to a thermal head unit 13 by the rotation of a platen roller 12 in the direction of arrow. Designated by 10*b* is a loading portion for the roll of paper by which the roll of paper 10 is removably loaded. The platen roller 12 conveys the recording paper 11 in the direction of arrow b and also presses an ink sheet 14 and the recording paper 11 between the thermal head 13 and a heat generating member 132. The recording paper 11 on which image recording has been effected by the heat generation of the thermal head 13 is conveyed toward discharge rollers 16*a* and 16*b* by further rotation of the platen roller 12, and when image recording of one page is completed, the recording paper is cut into a page unit by the meshing engagement of cutters 15*a* and 15*b* and discharged.

The reference numeral 17 designates an ink sheet supply roll on which an ink sheet 14 is wound, and the reference numeral 18 denotes an ink sheet take-up roll driven by an ink sheet conveying motor which will be described later to take up the ink sheet 14 in the direction of arrow a. The ink sheet supply roll 17 and the ink sheet take-up roll 18 are removably loaded in an ink sheet loading portion 70 within the apparatus body. Further, the reference numeral 19 designates a sensor for detecting the remaining quantity of the ink sheet 14 and the conveyance velocity of the ink sheet 14. The reference numeral 20 denotes an ink sheet sensor for detecting the presence of the ink sheet 14, and the reference numeral 21 designates a spring for pressing the thermal head 13 against the platen roller 12 with the recording paper 11 and the ink sheet 14 being interposed therebetween. The reference numeral 22 denotes a recording paper sensor for detecting presence of the recording paper.

The construction of the reading unit 100 will now be described.

In FIG. 1, the reference numeral 30 designates a light source for illuminating an original 32. The light reflected by the original 32 is input to a CCD sensor 31 through an optical system (mirrors 50, 51 and a lens 52) and converted into an electrical signal. The original 32 is conveyed correspondingly to the reading speed for the original 32 by conveying rollers 53, 54, 55 and 56 driven by an original conveying motor, not shown. The reference numeral 57 denotes an original supporting table, and a plurality of originals 32 supported on this original supporting table 57 are separated one by one by the cooperation between the conveying roller 54 and a pressing-separating piece 58 while being guided by a slider 57*a*, and are conveyed to the reading unit 100 and discharged onto a tray 77 after they are read.

The reference numeral 41 designates a control base plate constituting the major portion of the control unit 101. Various control signals are output from this control base plate 41 to the various portions of the apparatus. The reference numeral 106 denotes a modem base plate unit, and the reference numeral 107 designates an NCU base plate unit.

Figure 1A:
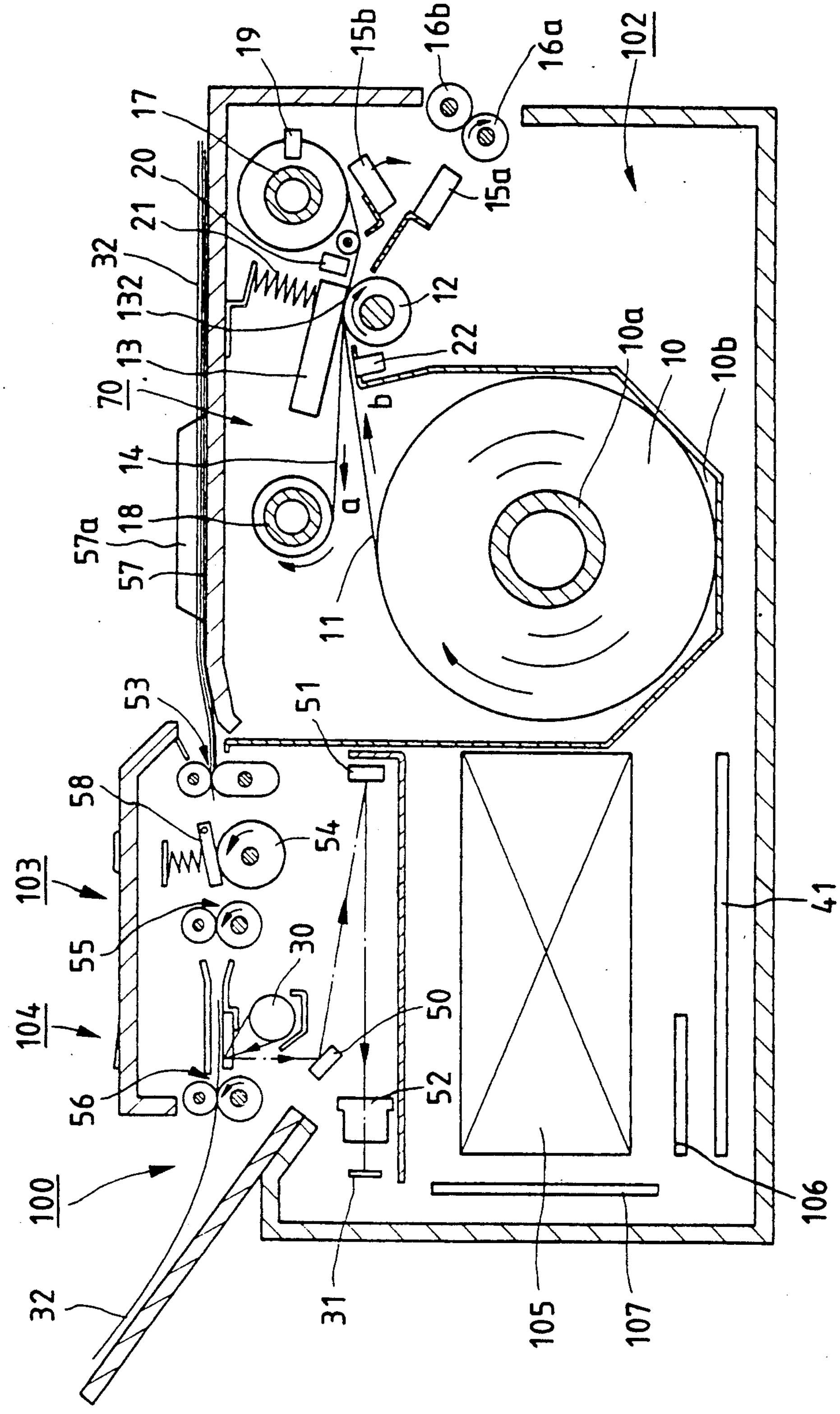
FIG. 1A is a side cross-sectional view showing the mechanism portion of a facsimile apparatus to which an embodiment of the present invention is applied.
Figure 1B:
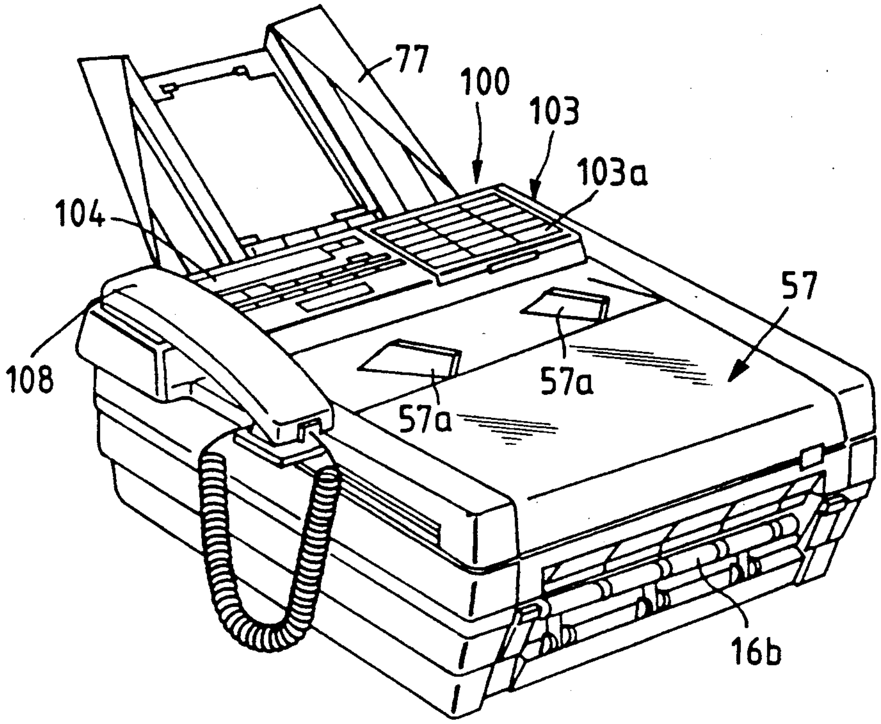
FIG. 1B is a pictorial perspective view of the facsimile apparatus shown in FIG. 1A.
Figure 3:
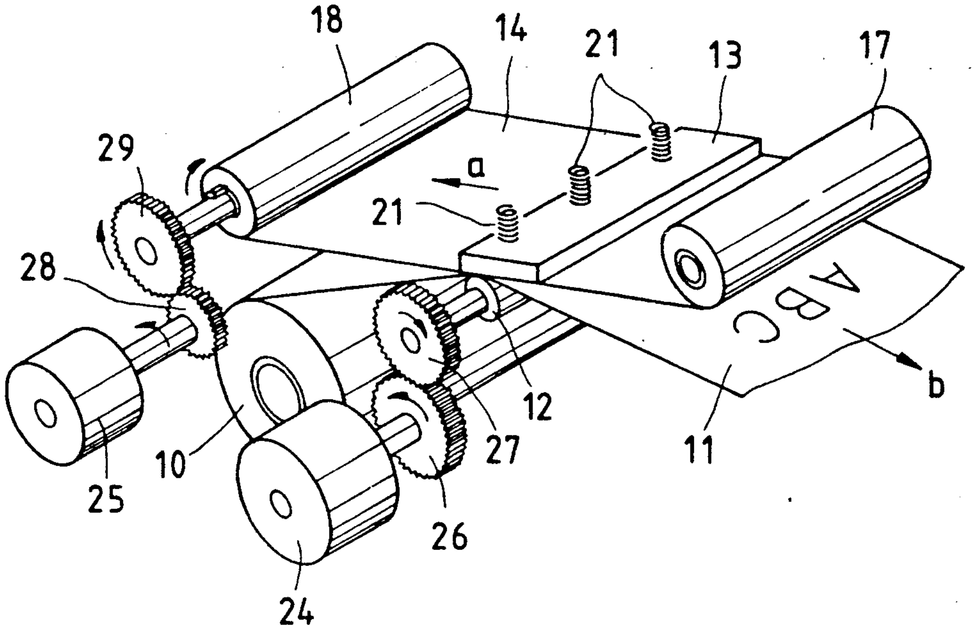
FIG. 3 shows the structure of a conveying system for an ink sheet and recording paper.

Further, FIG. 3 shows the details of a conveying mechanism for the ink sheet 14 and the recording paper 11.

In FIG. 3, the reference numeral 24 denotes a recording paper conveying motor for conveying the recording paper 11 in the direction of arrow b opposite to the direction of arrow a. The reference numeral 25 designates an ink sheet conveying motor for conveying the ink sheet 14 in the direction of arrow a. Further, the reference numerals 26 and 27 denote transmission gears for transmitting the rotation of the recording paper conveying motor 24 to the platen roller 12, and the reference numerals 28 and 29 designate transmission gears for transmitting the rotation of the ink sheet conveying motor 25 to the take-up roll 18.

By thus making the conveyance directions of the recording paper 11 and the ink sheet 14 opposite to each other, the direction in which images are successively recorded along the length of the recording paper 11 (the direction of arrow a, i.e., the direction opposite to the conveyance direction of the recording paper 11) coincides with the conveyance direction of the ink sheet 14. Here, if the conveying velocity $V_P$ of the recording paper 11 is $V_P=-n\cdot V_I$ ($V_I$ is the conveying velocity of the ink sheet 14 and − indicates that the conveyance direction of the recording paper 11 and the conveyance direction of the ink sheet 14 differ from each other), the relative velocity $V_{PI}$ of the recording paper 11 and the ink sheet 14 to the thermal head 13 is expressed as $V_{PI}=V_P-V_I(1+1/n)V_P$, and it is seen that this relative velocity $V_{PI}$ is greater than $V_P$, i.e., greater than the conventional relative velocity shown by the aforementioned equation (1).

Besides this, there is a method of conveying the ink sheet 14 in the direction of arrow a by (l/m) for each (n/m) line (m being an integer and $n>m$) when recording of n lines is effected by the thermal head 13, or a method of conveying the ink sheet 14 during recording in the direction opposite to the conveyance direction of the recording paper 11 and at the same velocity as the recording paper 11 when a distance corresponding to the length L is recorded, and rewinding the ink sheet 14 by $L\cdot(n-1)/n$ ($n>1$) before the next predetermined amount of recording. In any of these cases, the relative velocity when recording is effected with the ink sheet 14 stopped is $V_P$, and the relative velocity when recording is effected while the ink sheet 14 is moved is $2V_P$.

Figure 4:
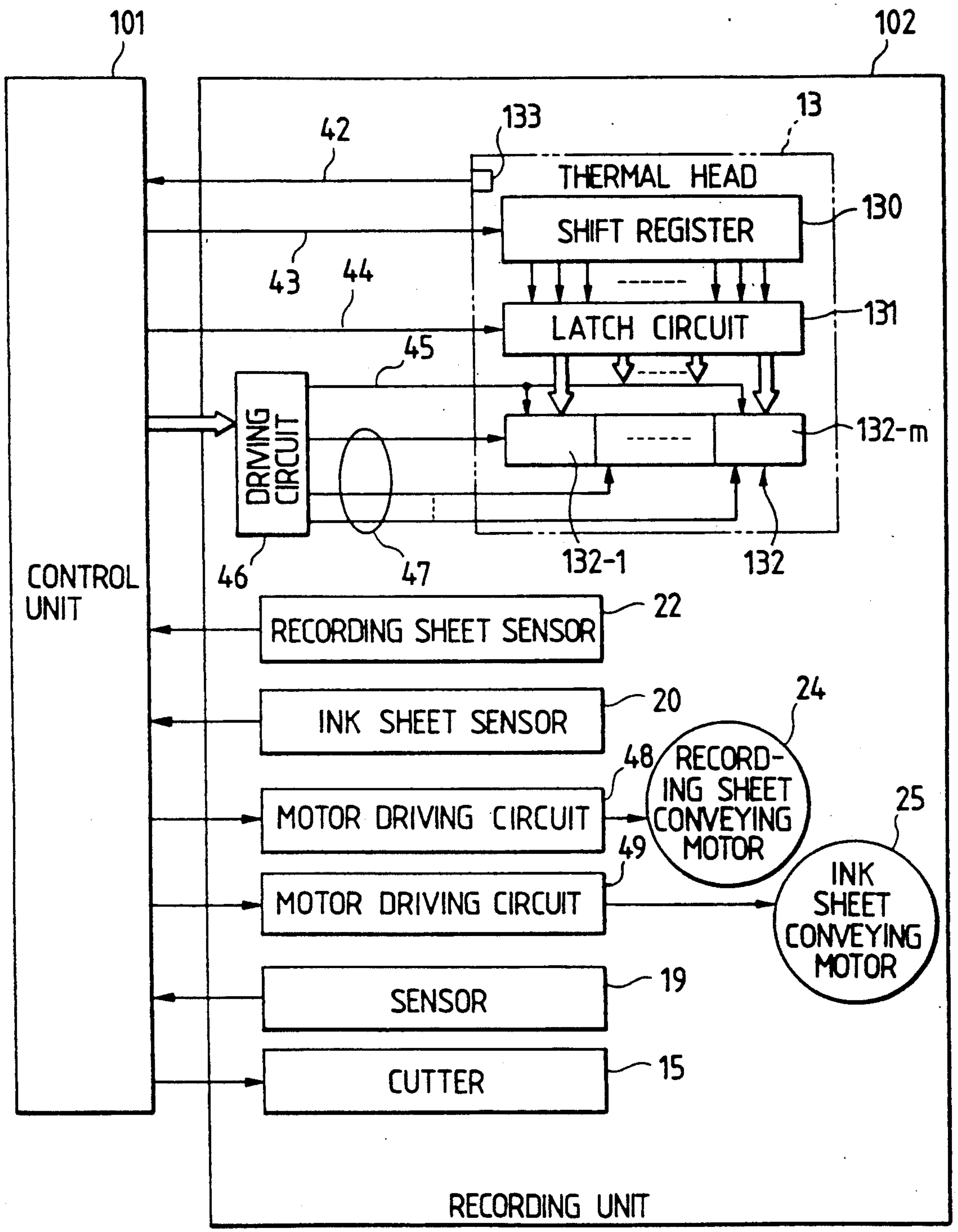
FIG. 4 shows the electrical connection between the control unit and the recording unit of a first embodiment.

FIG. 4 shows the electrical connection between the control unit 101 and the recording unit 102 in the facsimile apparatus of the present embodiment. In FIG. 4, portions common to those in the other figures are designated by similar reference numerals.

The thermal head 13 is a line head. This thermal head 13 is provided with a shift register 130 for inputting the serial record data 43 of one line from the control unit 101, a latch circuit 131 for latching the data of the shift register 130 by a latch signal 44, and a heat generating element 132 comprising heat generating resistance members corresponding to one line. Here, the heat generating element 132 is divided into m blocks indicated by 132-1 to 132-m and is driven. The reference numeral 133 designates a temperature sensor attached to the thermal head 13 for detecting the temperature of the thermal head 13. The output signal 42 of this temperature sensor 133 is A/D-converted in the control unit 101 and input to the CPU 113. Thereby, the CPU 113 detects the temperature of the thermal head 13 and changes the pulse width of a strobe signal 47 correspondingly to that temperature or changes the driving voltage of the thermal head 13, thereby changing the applied energy to the thermal head 13 in conformity with the characteristic of the ink sheet 14. The kind (characteristic) of this ink sheet 14 is indicated by the aforementioned switch 103*a*. The kind or characteristic of the ink sheet 14 may be automatically discriminated by detecting a mark or the like printed on the ink sheet 14, or may be automatically discriminated by detecting a mark, a cut-away or a projection formed on the cartridge of the ink sheet.

The reference numeral 46 designates a driving circuit for receiving as an input a driving signal for the thermal head 13 from the control unit 101 and outputting a strobe signal 47 for driving the thermal head 13 at each block unit. This driving circuit 46 can change the voltage output to a power source line 45 for supplying an electric current to the heat generating element 132 of the thermal head 13, by the instruction of the control unit 101, and change the applied energy to the thermal head 13. The reference numerals 48 and 49 denote motor driving circuits for rotatively driving the recording paper conveying motor 24 and the ink sheet conveying motor 25, respectively. In the present embodiment, the recording paper conveying motor 24 and the ink sheet conveying motor 25 are stepping motors, whereas this is not restrictive, but they may be, for example, DC motors.

Description of Recording Operation (FIGS. 1-5)

Figure 5:
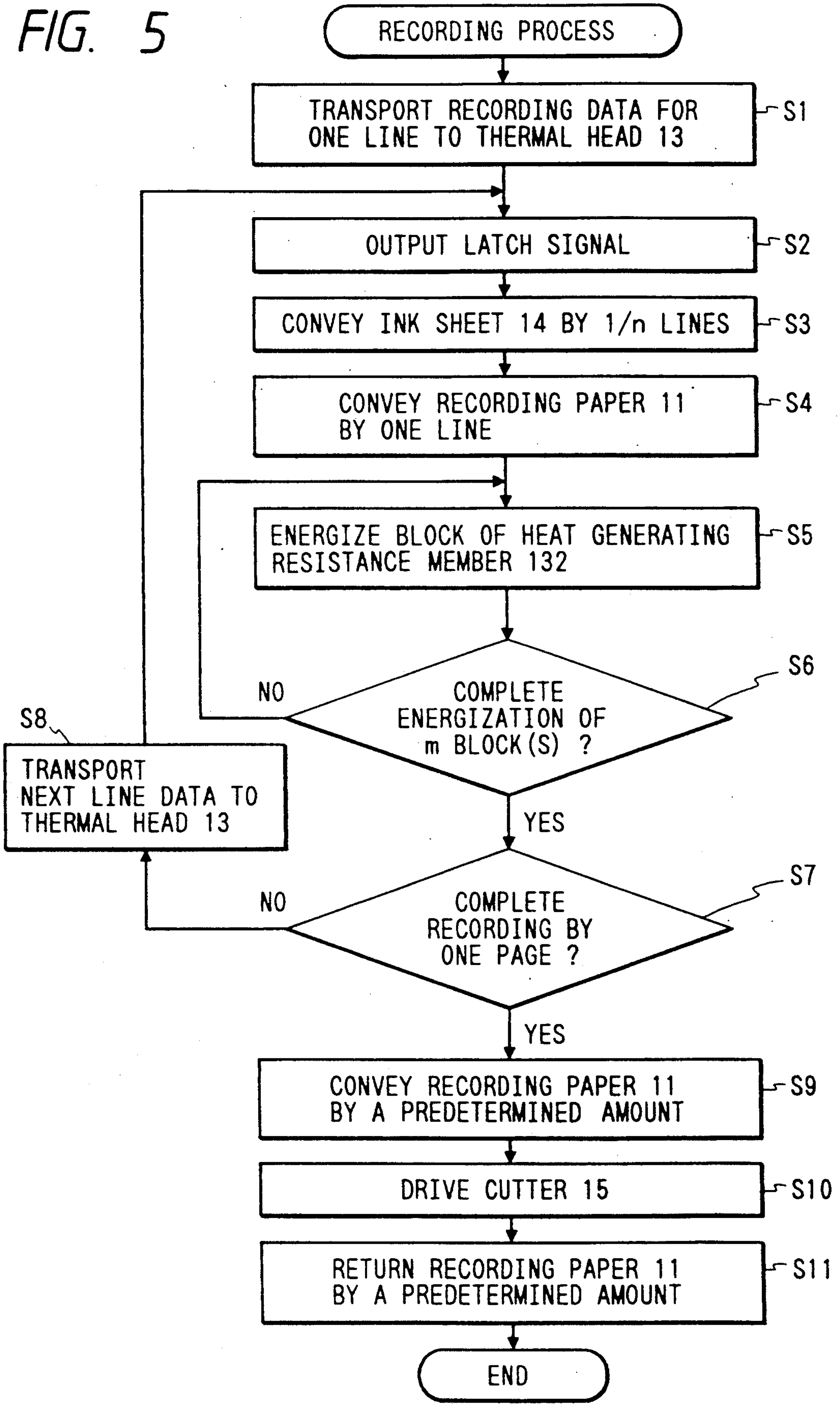
FIG. 5 is a flow chart showing the recording process of the first embodiment.

FIG. 5 is a flow chart showing one page recording process in the facsimile apparatus of the present embodiment, and the control program for executing this process is stored in the ROM 114 of the control unit 101.

This process is started by the image data of one line to be recorded being stored in the line memory 110 to thereby bring about a condition in which the recording operation can be started. First, at step S1, the recording data for one line is serially output to the shift register 130. When the transport of the recording data for one line is completed, at step S2, a latch signal 44 is output and the recording data for one line is stored into the latch circuit 131. Subsequently, at step S3, the ink sheet conveying motor 25 is driven to convey the ink sheet 14 by 1/n line in the direction of arrow a in FIG. 1. At step S4, the recording paper conveying motor 24 is driven to convey the recording paper 11 by one line in the direction of arrow b. The amount corresponding to one line is a length corresponding to the length of one dot recorded by the thermal head 13.

Advance is then made to step S5, where each block of the heat generating element 132 of the thermal head 13 is electrically energized. At step S6, whether all of m blocks have been electrically energized is examined, and when all blocks of the heat generating element 132 are electrically energized and recording of one line is completed, advance is made to step S7, where whether recording by one page has been completed is examined. If the recording by one page is not completed, advance is made to step S8, where the next line recording data is transported to the thermal head 13, and return is made to step S2.

In a series of cutter operations at step S7 to step S12, the ink sheet 14 when the recording paper 11 is conveyed may be conveyed at $V_P/n$ in the direction opposite to the conveyance direction of the recording paper 11 as during image recording, and the value of n may be made greater than that during recording. Further, the same movement as that of the recording paper 11 may be effected by the platen roller 12 or the like or the ink sheet 14 may remain stopped.

When recording by one page is completed at step S7, advance is made to step S9, where the recording paper 11 is conveyed toward paper discharge rollers 16*a* and 16*b* by a predetermined amount. At step S10, cutters 15*a* and 15*b* are driven and brought into meshing engagement with each other, to thereby cut the recording paper 11 into page-sized sheets. Subsequently, at step S11, the recording paper 11 is returned by a distance corresponding to the spacing between the thermal head 13 and the cutter 15, whereupon the recording process by one page is completed.

The value of n which determines the afore-described conveyance of the ink sheet can be changed not only depending on the amounts of rotation of the recording paper conveying motor 24 and the ink sheet conveying motor 25, but also by changing the reduction gear ratios of the transmission gears 26 and 27 of the driving system for the platen roller 12 and the transmission gears 28 and 29 of the driving system for the take-up roller 18. Also, where both the recording paper conveying motor 24 and the ink sheet conveying motor 25 are stepping motors, the value of n can be set by selecting the minimum step angles of those motors to different values. In this manner, the relative velocity of the recording paper 11 and the ink sheet 14 can be made equal to $(1+1/n)V_P$.

Also, as shown at steps S3 and S4, it is desirable that the driving of the ink sheet conveying motor 25 be earlier than the driving of the recording paper conveying motor 24. This is because even if the ink sheet conveying motor 25 is driven, there occurs a time delay due to the characteristic of that motor and the characteristic of the drive transmission system before the conveyance of the ink sheet 14 is actually started.

Figure 6:
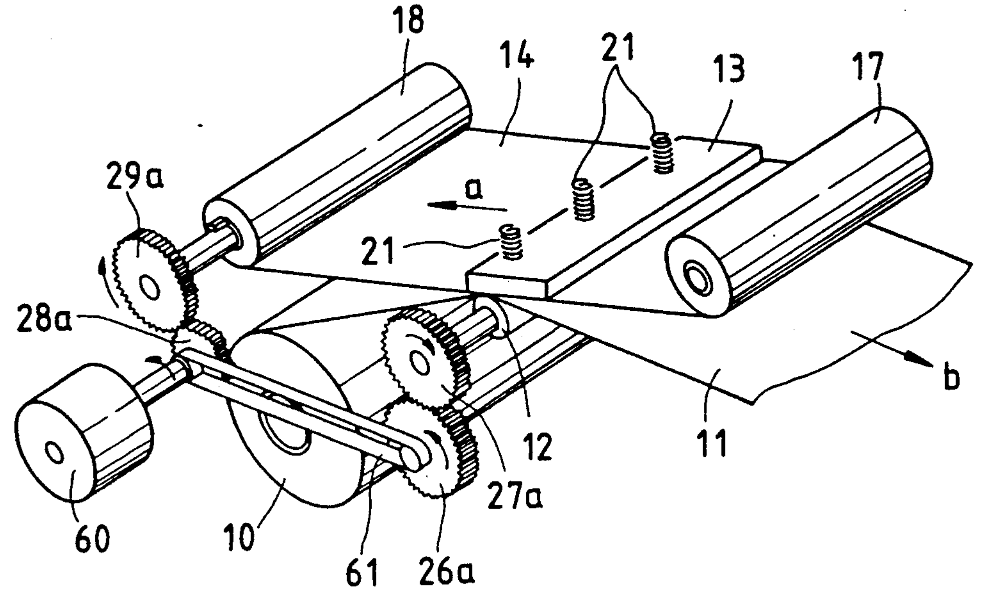
FIG. 6 shows the structure of a conveying system for an ink sheet and recording paper according to a second embodiment.
Figure 7:
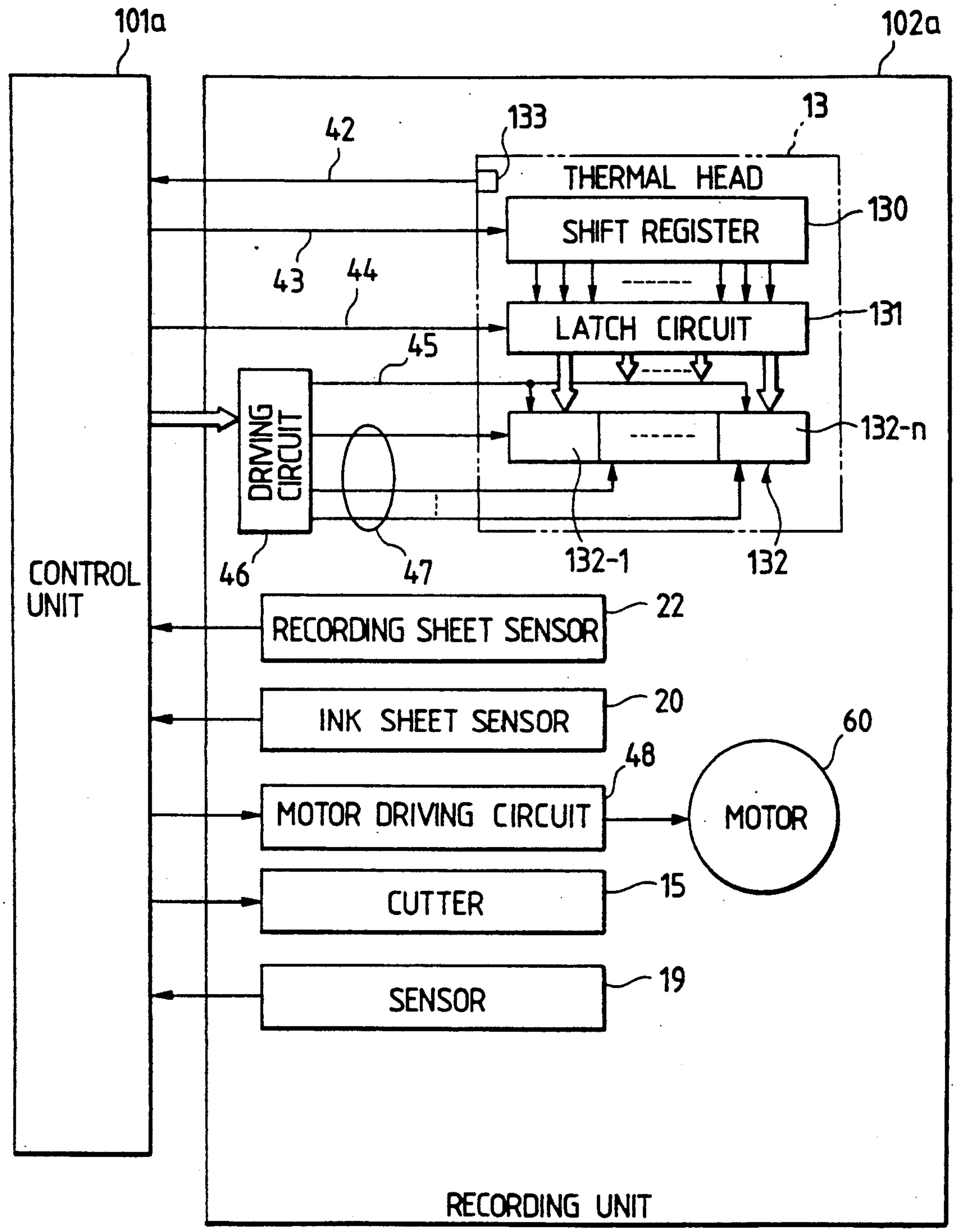
FIG. 7 shows the electrical connection between the control unit and the recording unit of the second embodiment.

Even if the driving of the recording paper conveying motor 24 is effected earlier, a similar effect will be obtained, but if the time from after the conveyance of the recording paper 11 is started until the driving of the thermal head 13 (the recording operation shown at step S4) becomes long, there may be formed gaps between recorded dots Description of Second Embodiment (FIGS. 6 and 7)

FIG. 6 shows a second embodiment in which a single motor is used for the conveyance of the recording paper 11 and the ink sheet 14. In FIG. 6, portions common to those in the first embodiment shown in FIG. 3 are designated by similar reference numerals. In this embodiment, the rotation of a motor 60 is transmitted to the roller 18 by transmission gears 28*a* and 29*a*. On the other hand, the platen roller 12 is rotatively driven by a belt 61 through transmission gears 26*a* and 27*a*.

FIG. 7 shows the then electrical connection between a control unit 101*a* and a recording unit 102*a*. As is apparent from the comparison with FIG. 4, the recording paper conveying motor 24 and the ink sheet conveying motor 25 are replaced by a single motor 60. At this time, the value of the aforementioned n can be changed by the reduction gear ratio of the transmission gears 26*a* and 27*a* and the reduction gear ratio of the transmission gears 28*a* and 29*a*. At this time, the conveying velocity (the take-up amount) of the ink sheet 14 is varied also by the diameter of the take-up roller 18 for the ink sheet 14 and thus, the conveying velocity of the ink sheet 14 varies though slightly immediately after the use of the ink sheet 14 is started and in the vicinity of the terminal end of the ink sheet 14.

Figure 8:
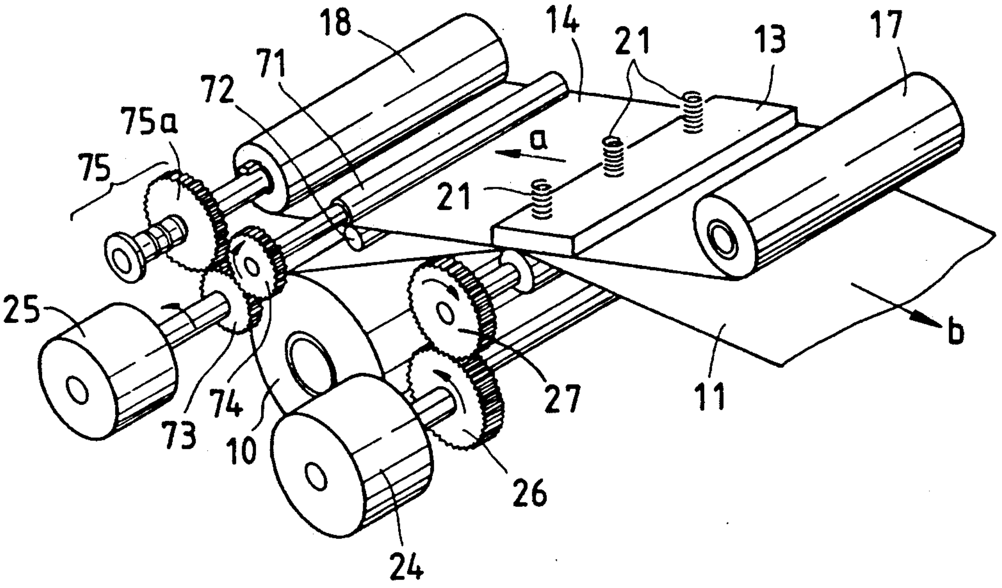
FIG. 8 shows a conveying drive system for an ink sheet and recording paper according to a third embodiment.

Description of Third Embodiment (FIG. 8)

FIG. 8 shows an embodiment in which, instead of the take-up roll 18 being directly driven as in the previous embodiment, the ink sheet 14 is conveyed in the direction of arrow a by a capstan roller 71 and a pinch roller 72, whereby the ink sheet 14 can always be conveyed by a predetermined amount irrespective of the take-up diameter of the ink sheet take-up roll 18. In FIG. 8, portions common to those in FIG. 3 are designated by similar reference numerals.

In FIG. 8, the reference numerals 73 and 74 designate reduction gears, and the reference numeral 75 denotes a slide clutch unit. Here, when the ink sheet conveying motor 25 and the recording paper conveying motor 24 are driven, the aforementioned n can be set by suitably setting the value of the reduction gear ratio $i_I$ of reduction gears 73 and 74 and the value of the reduction gear ratio $i_P$ of gears 26 and 27. Also, by the gear 73 being engaged with the gear 75*a* of the slide clutch 75, the take-up roll 18 can take up the ink sheet 14 conveyed by the capstan roller 71 and the pinch roller 72.

By setting the ratio of the gears 74 and 75*a* so that the length of the ink sheet 14 taken up onto the take-up roll 18 by the rotation of the gear 75*a* is greater than the length of the ink sheet conveyed by the capstan roller 71, the ink sheet 14 conveyed by the capstan roller 71 is reliably taken up onto the take-up roll 18. The amount corresponding to the difference between the take-up amount of the ink sheet 14 by the take-up roll 18 and the amount of the ink sheet 14 conveyed by the capstan roller 71 is absorbed by the slide clutch unit 75. Thereby, the fluctuation of the conveying velocity of the ink sheet 14 caused by the fluctuation of the take-up diameter of the take-up roll 18 can be suppressed.

The ink sheet conveying motor 25 of FIG. 5 can be comprised of a motor 60 as shown in FIG. 6 and the motor 24 can be eliminated so that the conveyance of the ink sheet 14 and the recording paper 11 may be accomplished by a single motor.

Figure 9:
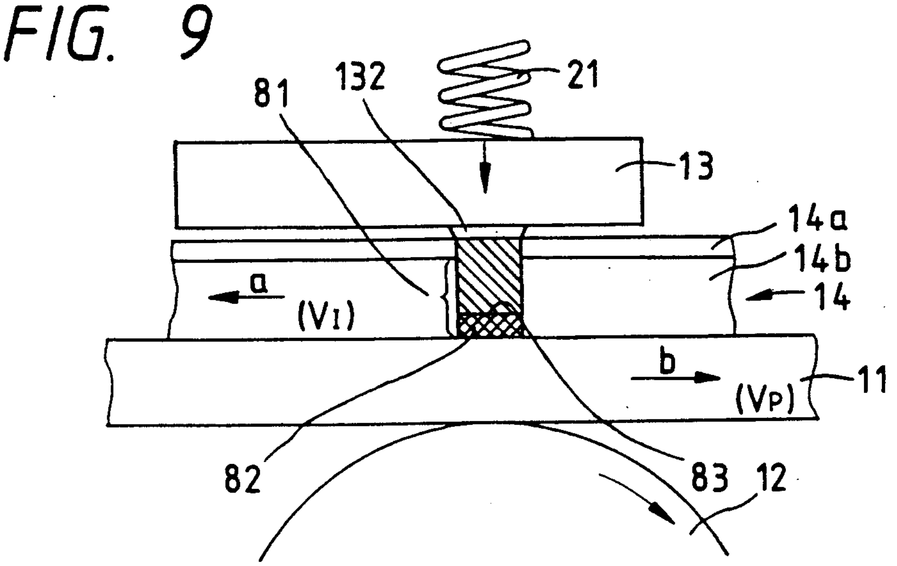
FIG. 9 shows the states of the recording paper and the ink sheet during the recording in this embodiment.

Description of the Principle of Recording (FIG. 9)

FIG. 9 shows the image recording condition when image recording is effected with the conveyance directions of the recording paper 11 and the ink sheet 14 in this embodiment made opposite to each other.

As shown, the recording paper 11 and the ink sheet 14 are nipped between the platen roller 12 and the thermal head 13, and the thermal head 13 is pressed against the platen roller 12 with a predetermined pressure by the spring 21. The recording paper 11 is conveyed in the direction of arrow b at a velocity $V_P$ by the rotation of the platen roller 12. On the other hand, the ink sheet 14 is conveyed in the direction of arrow a at a velocity $V_I$ by the rotation of the ink sheet conveying motor 25. As will be described later, a state in which the ink sheet 14 is stopped may also be assumed.

When the heat generating resistance member 132 of the thermal head 13 is now electrically energized and heated by the power source 105, that portion of the ink sheet 14 which is indicated by hatching 81 is heated. The reference character 14*a* designates the base film of the ink sheet 14, and the reference character 14*b* denotes the ink layer of the ink sheet 14. The ink of the ink layer 81 heated by the heat generating resistance member 132 being electrically energized melts and that portion thereof which is indicated by 82 is transferred to the recording paper 11. This transferred ink layer portion 82 corresponds to approximately 1/n of the ink layer indicated by 81.

During this transfer, it is necessary to cause a shearing force for the ink in the border line 83 of the ink layer 14*b* and transfer only the ink layer portion 82 to the recording paper 11. However, this shearing force differs depending on the temperature of the ink layer, and tends to become smaller as the temperature of the ink layer becomes higher. So, from the fact that a shorter heating time for the ink sheet 14 results in a greater shearing force in the ink layer, if the relative velocity of the ink sheet 14 and the recording paper 11 is made greater, the ink layer to be transferred can be reliably peeled from the ink sheet 14.

According to this embodiment, the heating time of the thermal head 13 in the facsimile apparatus is as short as about 0.6 ms and therefore, by making the conveyance direction of the ink sheet 14 and the conveyance direction of the recording paper 11 opposite to each other, the relative velocity of the ink sheet 14 and the recording paper 11 is increased.

Figure 10:
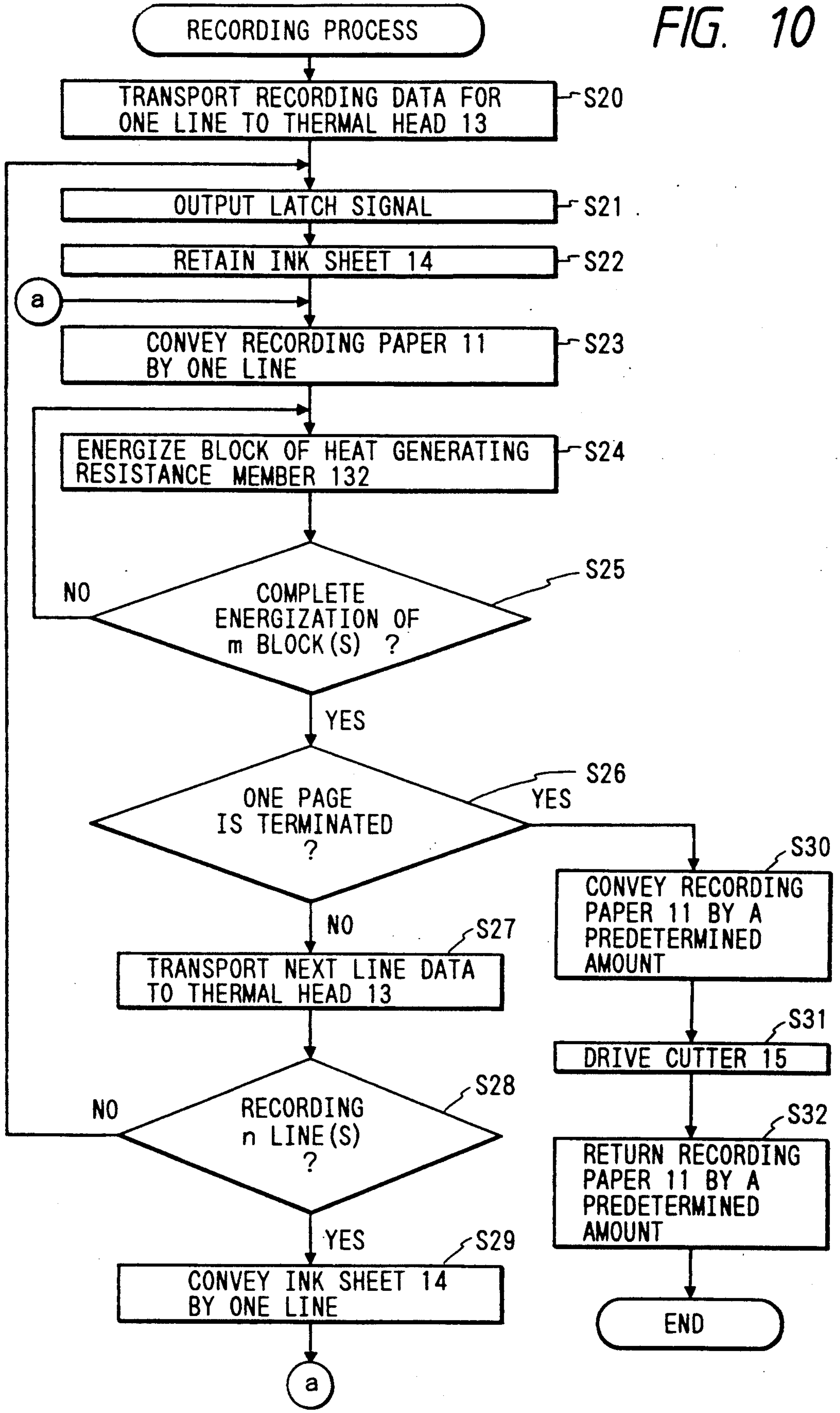
FIG. 10 is a flow chart showing the recording process of a fourth embodiment.

Description of Fourth Embodiment (FIG. 10)

FIG. 10 is a flow chart showing a heat transfer recording method according to a fourth embodiment. Here, n lines are recorded on the recording paper 11 with the ink sheet 14 remaining stopped. After the recording of n lines, the ink sheet 14 is conveyed by an amount corresponding to one line in the direction opposite to the conveyance direction of the recording paper 11. The block diagram of the facsimile apparatus for executing this control program is similar in construction to the block diagram shown in FIG. 2, and this control program is stored in the ROM 114 of the control unit 101.

At steps S20 and S21, as at the steps S1 and S2 of the flow chart shown in FIG. 5, recording data for one line is transported to the thermal head 13. At step S22, the energization signal of the ink sheet conveying motor 25 is fixed and the ink sheet 14 is retained while being stretched by the detent torque thereof. At step S23, the recording paper conveying motor 24 is driven and the conveyance of the recording paper 11 by one line is started. At steps S24 and S25, as at the steps S5 and S6 shown in FIG. 5, the thermal head 13 is electrically energized by the power source 105.

Subsequently, at step S26, whether image recording by one page has been completed is examined, and if it is not completed, advance is made to step S27, where the next line image recording data is transported to the thermal head 13. At step S28, whether the recording is the nth line image recording is examined, and if it is not the nth line image recording, return is made to step S21, and advance is made to the next line recording process. If it is the nth line image recording, advance is made to step S29, where the ink sheet conveying motor 25 is driven to convey the ink sheet 14 by one line in the direction of arrow a. Return is then made to step S23, where the recording paper 11 is conveyed by one line in the direction of arrow b, and advance is made to the next line image recording process. When at step S26, image recording by one page is completed, advance is made to step S30. The process of steps S30–S32 is similar to the steps S9–S11 shown in FIG. 5 and therefore need not be described.

During the recording of the nth line to the (n−1)th line, the relative velocity $V_{PI}$ of the recording paper 11 and the ink sheet 14 is equal to the conveyance velocity $V_P$ of the recording paper 11, but the relative velocity $V_{PI}$ during the recording of the nth line is $2V_P$.

Also, in the flow chart shown in FIG. 10, the ink sheet 14 is conveyed by one line during the recording of the nth line, but alternatively, the conveyance of the ink sheet 14 may be effected while being divided into s(n≠s) times during the recording of n lines so that the ink sheet 14 may be conveyed by one line by the recording of n lines.

When the above-described image recording is to be carried out, it is anticipated that during the recording of 1-(n−1) lines, the image recording process is forcibly discontinued by the user or the power source 105 is switched off. It is therefore necessary to convey the ink sheet 14 by (1/P) lines (P>1) before the image recording process is started. Thereby, the same portion of the ink sheet 14 can be prevented from being used n times or more on end.

Description of Fifth Embodiment (FIGS. 11-14)

Figure 11:
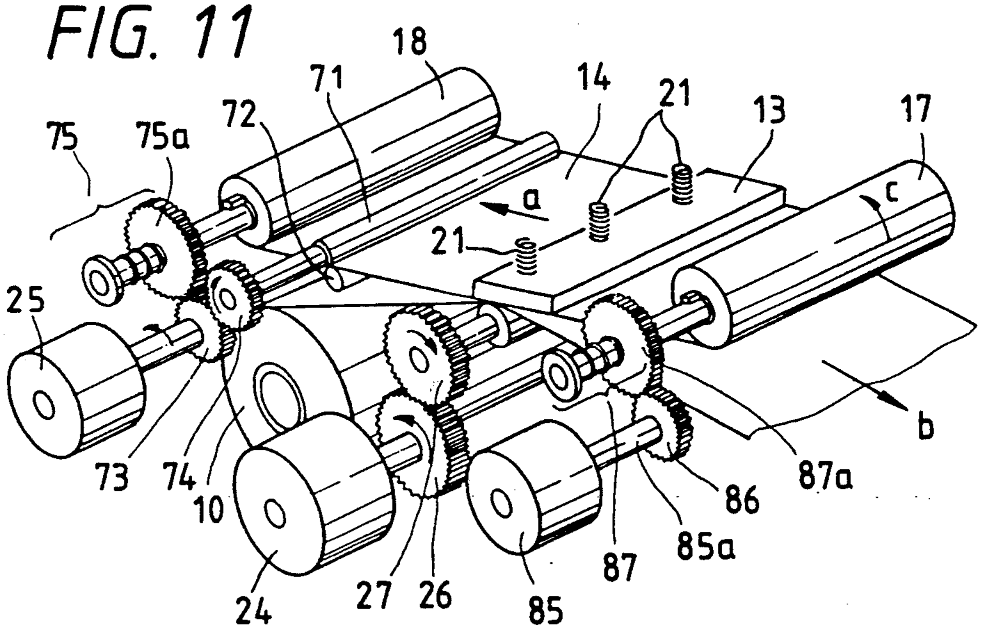
FIG. 11 shows the structure of a conveying system for an ink sheet and recording paper according to a fifth embodiment.
Figure 12:
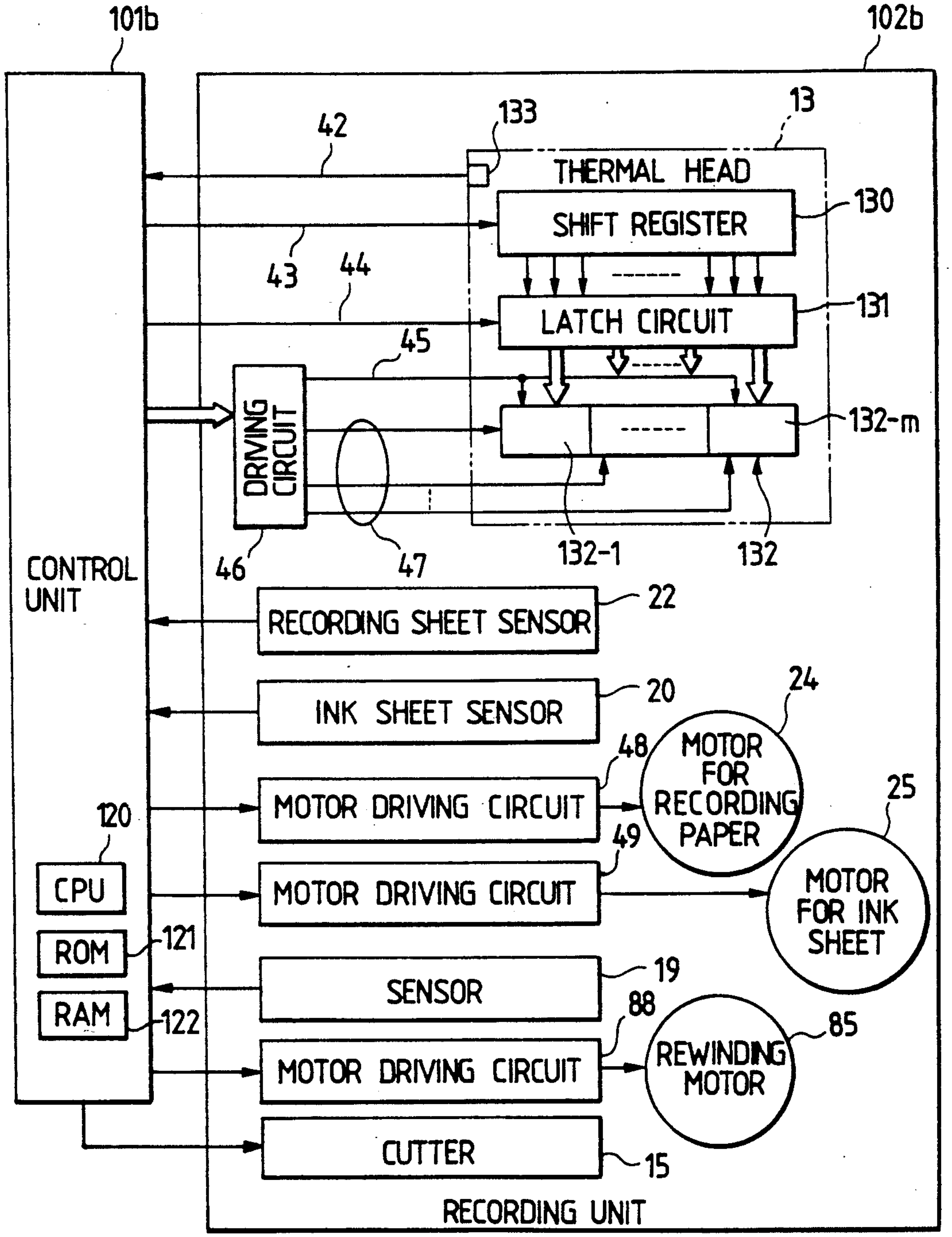
FIG. 12 shows the electrical connection between the control unit and the recording unit in the fifth embodiment.

FIG. 11 shows a conveying system for the ink sheet 14 and the recording paper 11 according to a fifth embodiment, and FIG. 12 shows the then electrical connection between a control unit 101*b* and a recording unit 102*b*.

The construction of the conveying system shown in FIG. 11 is equal to the construction of the conveying system of FIG. 8 having added thereto a rewinding motor 85 for rotating the supply roller 17 for the ink sheet 14 in the direction of arrow c and rewinding the ink sheet 14, and a transmission gear 86 and a slide clutch 87 for transmitting the rotation of the rewinding motor to the supply roller 17.

The gear 86 is mounted on the rotary shaft 85*a* of the rewinding motor 85, and this gear 86 is in meshing engagement with the gear 87*a* of the slide clutch 87. Thus, clockwise rotation of the gear 86 causes counter-clockwise rotation of the gear 87*a*, whereby the ink sheet 14 can be taken up onto the supply roll 17. On the other hand, when the ink sheet 14 is to be conveyed in the direction of arrow a, the supply roller 17 can be freely rotated in the direction opposite to the direction of arrow c by the action of the slide clutch 87.

Figure 13:
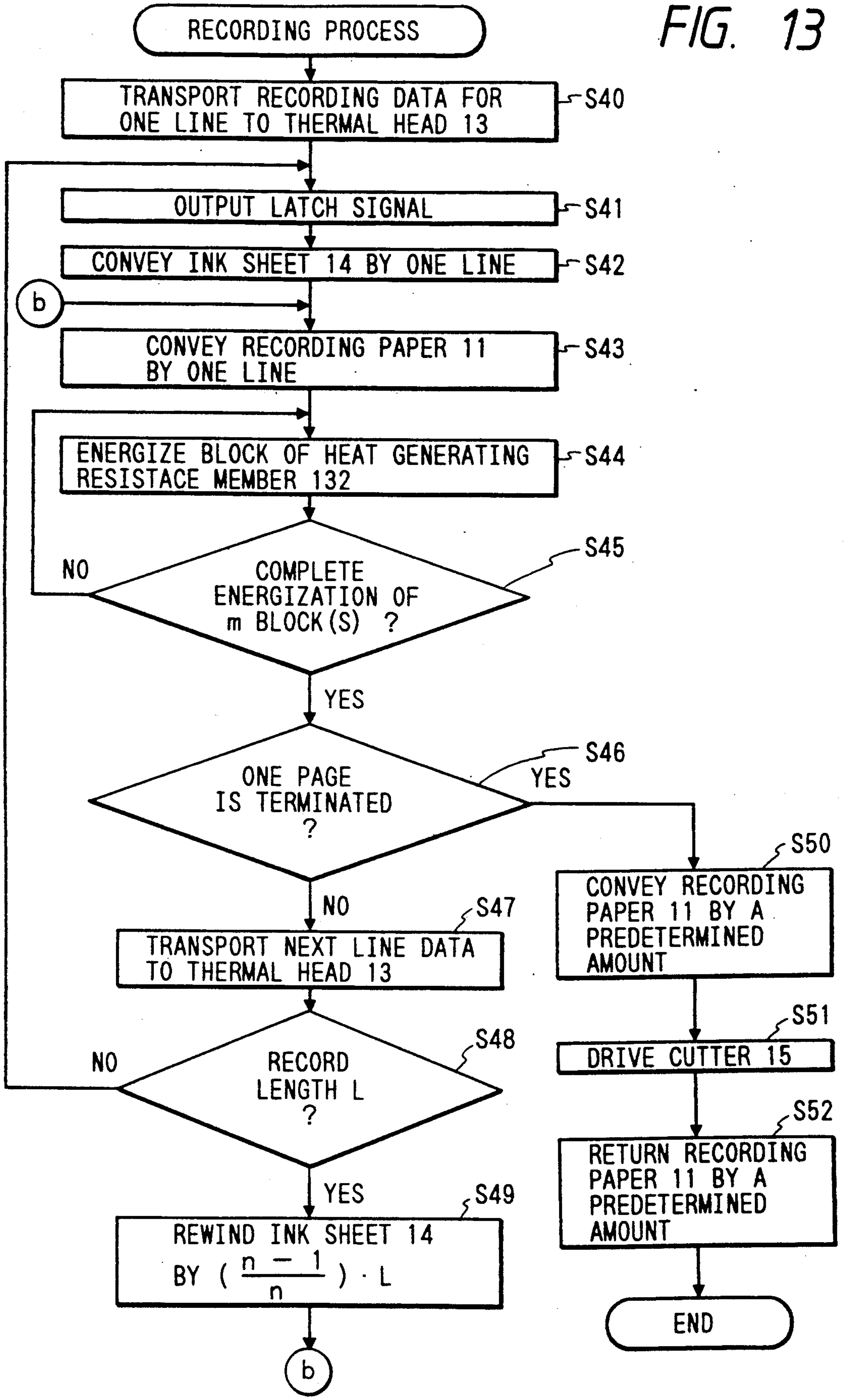
FIG. 13 is a flow chart showing the recording process of the fifth embodiment.

FIG. 13 is a flow chart showing the image recording process in the fifth embodiment, and the control program for executing this process is stored in the ROM 121 of the control unit 101*b*.

First, at steps S40 and S41, as at the steps S1 and S2 shown in FIG. 5, recording data for one line is latched in the thermal head 13. At step S42, the ink sheet conveying motor 25 is driven to convey the ink sheet 14 by one line in the direction of arrow a. Subsequently, at step S43, the recording paper 11 is conveyed by one line in the direction of arrow b. Further, at steps S44 and S45, as at the steps S5 and S6 shown in FIG. 5, image data for one line is recorded.

At step S46, whether image recording by one page has been completed is examined, and if the recording by one page is not completed, advance is made to step S47, where the image data for one line to be subsequently recorded is transported to the thermal head 13. At step S48, whether image data corresponding to the length "L" of the recording paper 11 has been recorded is examined, and if recording is not effected by an amount corresponding to the length L, return is made to step S41, where the next line image recording is effected. If at step S48, recording is effected by the amount corresponding to the length "L", advance is made to step S49, where the rotation of the ink sheet conveying motor 25 is reversed by the motor driving circuit 49, whereby the ink sheet 14 is returned by (n−1)L/n in the direction b opposite to the direction arrow a. The rewinding motor 85 is then rotatively driven by a predetermined amount by the motor driving circuit 88, whereby the ink sheet 14 of a length (n−1)L/n is taken up onto the supply roll 17. When the ink sheet 14 is thus sufficiently rewound, the slide clutch 87 slides and therefore, there is no possibility of more than necessary tension being imparted to the ink sheet 14. When the ink sheet 14 is thus rewound by (n−1)L/n, return is made to step S43. On the other hand, when image recording by one page is completed at step S46, advance is made to step S50, and at steps S50–S52, the same process as that of the steps S9–S11 shown in FIG. 5 is carried out.

Thus, the ink sheet 14 is multiprinted maximum n times, and this system is particularly effective when use is made of cut paper whose distance of conveyance is clear.

In this system, even if recording is forcibly completed during the recording operation, recording can be resumed from the current ink sheet position. At this time, however, there is the possibility that portion of the ink sheet which is located at the first recording position is not multiprinted n times. This also holds true of the first portion of the ink sheet 14 which is used for recording.

Figure 14:
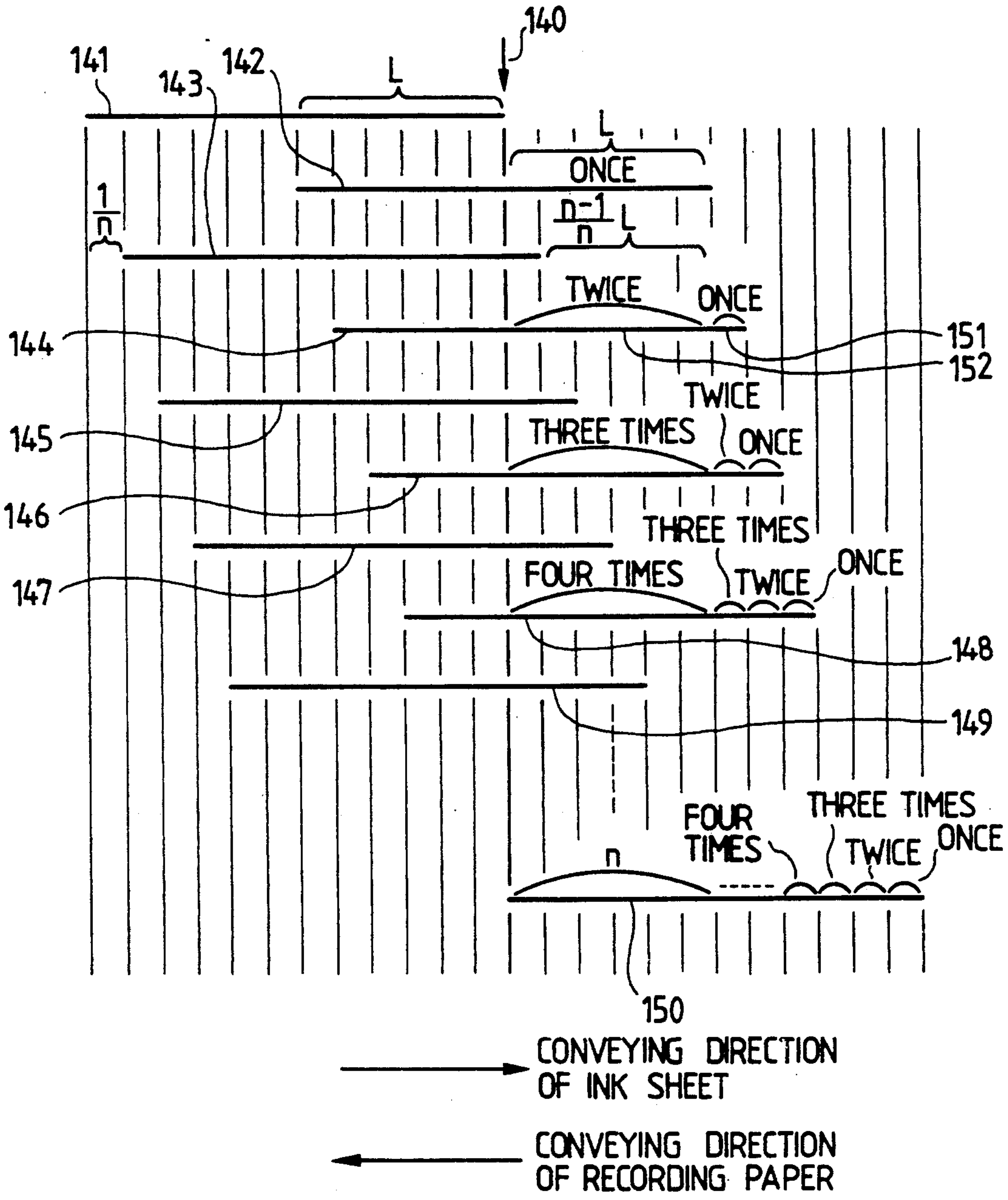
FIG. 14 shows an example of the use of the ink sheet in the fifth embodiment.

FIG. 14 shows the conveyance distance of the ink sheet 14 when recording is effected by the fifth embodiment and the frequency of use of the ink sheet 14.

The reference numeral 140 indicates the position of the thermal head 13, and the reference numeral 141 indicates a length corresponding to one page before image recording is started. The reference numeral 142 indicates the state after the recording by the length "L", and the reference numeral 143 shows a state in which the ink sheet 14 has been rewound by (n−1)L/n after the recording by the length "L". Here, n is set to n=6. The reference numeral 144 shows the state when recording has been effected by the length L next time, and that portion of the ink sheet 14 which is indicated by 151 is used only once, and that portion of the ink sheet 14 which is indicated by 152 is used twice.

Likewise, the reference numeral 145 shows a state in which the ink sheet has been rewound by 5/6 of L after the second recording, the reference numeral 146 shows a state in which recording has been effected by the length "L" only at the third time, and the reference numeral 147 shows the state when the ink sheet has been rewound by 5L/6 after the third recording. Likewise, the reference numeral 148 shows the state after the fourth recording, and the reference numeral 149 shows the state when the ink sheet has been rewound by 5L/6 after the fourth recording. After in this manner, image recording has been effected n times as shown by 150, the length corresponding to 1/n of the used ink sheet 14 is multiprinted once, twice, three times and so on from right.

Figure 15:
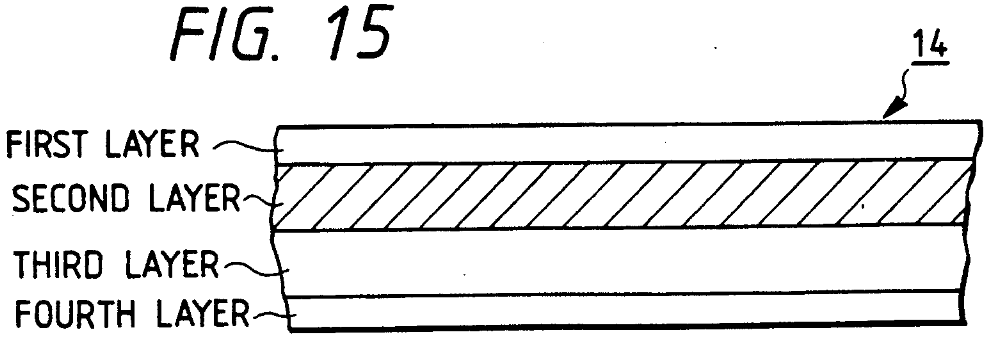
FIG. 15 is a cross-sectional view of the ink sheet used in this embodiment.

Description of Ink Sheet (FIG. 15)

FIG. 15 is a cross-sectional view of the ink sheet used for the multiprint of the present invention, and this ink sheet is constructed of four layers.

First, the second layer is a base film which provides a support for the ink sheet 14. In the case of multiprint, heat energy is applied to the same portion several times and therefore, aromatic polyamide film or condenser paper which is high in heat resistance is advantageous, but conventional polyester film is also good for use. As regards the thickness of these, the smallest possible thickness is advantageous in respect of the quality of print from their role as a medium, and 3–8 $\mu m$ is desirable in respect of strength.

The third layer is an ink layer containing an amount of ink capable of being transferred to the recording paper (recording sheet) n times. The chief components of this layer are resin such as EVA as an adhesive agent, carbon black or nigrosine dye for coloring and carnauba wax or paraffin wax as a binding material, and these are combined so as to be good for n uses in the same portion. The amount of these materials applied may desirably be 4–8 $g/m^2$, but sensitivity and concentration differ depending on the amount of application, and the amount of application can be selected arbitrarily.

The fourth layer is a top coating layer for preventing the ink of the third layer from being pressure-transferred to the recording paper in the portion thereof which should not be printed, and this layer is composed of transparent wax or the like. Thus, it is only the transparent fourth layer that is pressure-transferred, and the ground of the recording paper can be prevented from being stained. The first layer is a heat-resisting coat layer for protecting the base film which is the second layer from the heat of the thermal head 13. This is suitable for the multiprint in which heat energy for n lines may be applied to the same portion (when black information is continuous), but the use or non-use thereof can be suitably selected. This is also effective for base film of relatively low heat resistance such as polyester film.

The construction of the ink sheet 14 is not restricted to this embodiment, but may be, for example, a construction comprising a base layer and a porous ink retaining layer containing ink therein which is provided on one side of the base layer, or a construction comprising a base film and a heat-resisting ink layer of fine porous net-like structure provided on the base layer, ink being contained in the ink layer. Also, the material of the base film may be a film comprising, for example, polyimide, polyethylene, polyester, polyvinyl chloride, triacetyl cellulose, nylon or the like, or paper. Further, the heat-resisting coat layer is not always necessary, and the material thereof may be, for example, silicone resin, epoxy resin, fluorine resin, etholocellulose or the like.

Also, as an example of the ink sheet having heat-sublimating ink, mention may be made of an ink sheet comprising a base material formed of polyethylene terephthalate, polyethylene naphthalate, aromatic polyamide film or the like, spacer particles formed of guanamine resin and fluorine resin, and a color material layer containing a dye, the spacer particles and the color material layer being provided on the base material.

Also, the heating system is not restricted to the afore-described thermal head system using a thermal head, but use may be made, for example, of the electrical energizing system or the laser transfer system.

According to this embodiment, as described above, the relative velocity of the recording paper 11 and the ink sheet 14 is kept, whereby the ink sheet 14 can be used for multiprint. Also, according to this embodiment, the range in which the value of n and the velocity $V_P$ of the recording paper 11 can be selected is widened, and this is effective for a case where as in a line printer in a facsimile apparatus, the conveying velocity $V_P$ of the recording paper 11 cannot be made higher than a certain degree ($V_P \approx 25$ mm/s) because of the applied energy to the thermal head 13.

Also, if in line print, the image recording width becomes great, the number of the heat generating elements of the thermal head electrically energized at a time will be increased and the severing force required to peel a predetermined ink layer from the ink sheet will become great. This may be compensated for by making the relative velocity of the recording paper and the ink sheet greater than a certain degree, and again in this point, the method of the present embodiment for making the conveyance directions of the ink sheet and the recording paper opposite to each other is effective.

Also, in the conventional system wherein the ink sheet and the recording paper are conveyed in the same direction, the relative velocity of the ink sheet and the recording paper is approximately "0", but according to this embodiment, the relative velocity is maximum $2V_P$ and stable multiprint can be realized.

While this embodiment has been described with respect to an example in which a thermal line head is used, this is not restrictive. For example, even in a case where use is made of an ink ribbon of the same material as the ink sheet described in this embodiment and recording is effected by a serial head, multiprint can be realized in a similar manner. That is, the ink ribbon carried on a carriage is taken up by 1/n of the recording length in a direction in which the carriage is moved (the recording direction), whereby multiprint can be realized. When at this time, the carriage is moved, for example, in the rightward direction, the ink ribbon is conveyed so as to move from left to right relative to the thermal head.

Also, the recording medium is not limited to recording paper, but may also be, for example, cloth, a plastic sheet or the like if it is of a quality capable of ink transfer. The ink sheet is not restricted to the construction shown in the embodiments, but may also be, for example, of a so-called ink sheet cassette type in which an ink sheet is contained in a housing.

According to the present invention, as described above, the relative velocity of the recording medium and the ink sheet can be made great to thereby improve the quality of recorded images in multiprint.

We claim:

1. A thermal transfer recording apparatus for transferring ink of an ink sheet to a recording medium to thereby effect recording of an image on said recording medium, having:

an ink sheet loading portion for loading the ink sheet;

a recording medium loading portion for loading the recording medium;

recording means for acting on said ink sheet loaded into said ink sheet loading portion to effect recording of an image on said recording medium; and conveying means for conveying said ink sheet loaded into said ink sheet loading portion in a direction opposite to a conveyance direction of said recording medium, wherein recording of n lines is effected with said ink sheet remaining stopped, and after the recording, said ink sheet is conveyed by an amount smaller than n lines in the direction opposite to the conveyance direction of said recording medium.

2. A thermal transfer recording apparatus for transferring ink of an ink sheet to a recording medium to thereby effect recording of an image on said recording medium, having:

a recording medium loading portion into which said recording medium can be loaded;

an ink sheet loading portion into which said ink sheet can be loaded;

recording means for acting on said ink sheet and effecting recording of an image on said recording medium;

conveying means for conveying said recording medium and said ink sheet in such a manner that a direction of recording an image on said recording medium is consistent with a direction of conveying said ink sheet, said conveying means including an ink sheet conveying motor and a recording medium conveying motor; and control means for controlling said conveying means so that said ink sheet conveying motor and said recording medium conveying motor are driven so that a conveyance length of said ink sheet is shorter than a conveyance length of said recording medium.

3. A thermal transfer recording apparatus for transferring ink of an ink sheet to a recording medium to thereby effect recording of an image on said recording medium, having:

a recording medium loading portion into which said recording medium is loaded;

an ink sheet loading portion into which said ink sheet is loaded;

recording means for acting on said ink sheet and effecting recording of an image on said recording medium; and conveying means for conveying said recording medium and said ink sheet in such a manner that a direction of recording an image on said recording medium is consistent with a direction of conveying said ink sheet, said conveying means including an ink sheet conveying motor which is a stepping motor and a recording medium conveying motor which is a stepping motor, said recording medium and said ink sheet being kept in contact and being moved so that the conveyance direction of said ink sheet is not the same as a conveyance direction of said recording medium so that the conveyance length of said ink sheet is less than the conveyance length of said recording medium in accordance with a minimum step angle of each said motor when driven.

4. A thermal transfer recording apparatus for transferring ink of an ink sheet to a recording medium to thereby effect recording an image on said recording medium, said apparatus comprising:

a recording medium loading portion into which said recording medium is loaded;

an ink sheet recording medium loading portion into which said ink sheet is loaded;

recording means for acting on said ink sheet and effecting recording of said image on said recording medium;

conveying means for said ink sheet and said recording medium so that a direction of recording said image on said recording medium is consistent with a direction of conveying said ink sheet; and control means for stopping said ink sheet to record on said recording medium for a predetermined length when recording said image and controlling said conveying means to convey said ink sheet by a length shorter than said predetermined length for each recording of said predetermined length.

5. A thermal transfer recording apparatus for transferring ink of an ink sheet to a recording medium to thereby effect recording an image on said recording medium, said apparatus comprising:

a recording medium loading portion into which said recording medium is loaded;

an ink sheet recording medium loading portion into which said ink sheet is loaded;

recording means for acting on said ink sheet and effecting recording said image on said recording medium;

conveying means for said ink sheet and said recording medium so that a direction of recording said image on said recording medium is consistent with a direction of conveying said ink sheet; and control means for causing said conveying means to convey said ink sheet and said recording medium by a same length to record said image of a predetermined length and control said conveying means to rewind said ink sheet by a length shorter than said predetermined length after recording by said predetermined length.

6. A thermal transfer recording apparatus according to claims 1, 2, 3, 4, or 5, wherein said ink sheet is conveyed by a capstan roller and a pinch roller.

7. A thermal transfer recording apparatus according to claims 1, 2, 3, 4, or 5, wherein the ink of said ink sheet is heat-meltable.

8. A thermal transfer recording apparatus according to claims 1, 2, 3, 4, or 5, wherein the ink of said ink sheet is heat-sublimating.

9. A thermal transfer recording apparatus according to claim 1, 2, 3, 4 or 5 wherein said direction of recording an image on said recording medium is consistent with a direction of successive recording by a serial head.

10. A thermal transfer recording apparatus according to claims 1, 2, 3, 4, or 5, wherein said ink sheet is of a narrow width and is of a serial type which is sequentially displaced along an image recording area to effect image recording.

11. A thermal transfer recording apparatus according to claims 1, 2, 3, 4, or 5, wherein a relative velocity of said recording medium and said ink sheet is equal to or greater than a conveying velocity of said recording medium or said ink sheet.

12. A thermal transfer recording apparatus according to claims 1, 2, 3, 4, or 5, wherein said ink sheet is of a full line type and which is provided substantially over a full width of an image recording area in opposed relationship therewith.

13. A thermal transfer recording apparatus according to claims 1, 2, 3, 4 or 5, wherein said apparatus further comprises communicating means for communicating with external equipment.

14. A thermal transfer recording apparatus according to claims 4, or 5, wherein said ink sheet and said recording medium are conveyed by drive forces of discrete motors.

15. A thermal transfer recording apparatus according to claims 4, or 5, wherein said ink sheet and said recording medium are conveyed by the drive force of a common motor.

16. A thermal transfer recording apparatus according to claims 2 or 3, wherein recording of n lines is effected with said ink sheet remaining stopped, and after the recording, said ink sheet is conveyed by an amount smaller than n lines in a direction opposite to a conveyance direction of said recording medium.

17. A thermal transfer recording apparatus according to claims 2 or 3, wherein at least during the image recording on said recording medium, the conveyance length of said ink sheet is made less than the conveyance length of said recording medium.

18. A thermal transfer recording apparatus according to claims 2, 3, 4, or 5, wherein said ink sheet has an amount of ink enabling plural times of image recording.

19. A thermal transfer recording method of transferring an ink of an ink sheet to a recording medium to thereby effect recording of an image on said recording medium, comprising the steps of: stopping said ink sheet during image recording and effecting a predetermined length of image recording on said recording medium, and after effecting said predetermined length of image recording, conveying said ink sheet by a length shorter than said predetermined length such that a direction of conveying of said ink sheet is consistent with a direction of recording an image on said recording medium.

20. A thermal transfer recording method of transferring ink of an ink sheet to a recording medium to thereby effect recording of an image on said recording medium, comprising the steps of: conveying said recording medium and said ink sheet by a same length and effecting a predetermined length of image recording on said recording medium, and such that a direction of conveying of said ink sheet is consistent with that of a direction of recording an image on said recording medium, after said predetermined length of image recording, said ink sheet is rewound by a length shorter than said predetermined length.

21. A thermal transfer recording method of transferring ink of an ink sheet to a recording medium to thereby effect recording of an image on said recording medium, comprising the steps of, stopping said ink sheet during image recording and effecting a predetermined length of image recording on said recording medium, and after effecting said predetermined length of image recording, conveying said ink sheet by a length shorter than said predetermined length such that a direction of conveying of said ink sheet is consistent with a direction of recording an image on said recording medium, wherein said ink sheet is of a full line type which is provided substantially over a full width of an image recording area in opposed relationship therewith.

22. A thermal transfer recording method of transferring ink of an ink sheet to a recording medium to thereby effect recording of an image on said recording medium, comprising the steps of: conveying said recording medium and said ink sheet by a same length and a predetermined length of image recording is effected on said recording medium, and after said predetermined length of image recording, said ink sheet is rewound by a length shorter than said predetermined length such that a direction of conveying of said ink sheet is consistent with a direction of recording an image on said recording medium, wherein said ink sheet is of a full line type which is provided substantially over a full width of an image recording area in opposed relationship therewith.

23. A thermal transfer recording method according to claims 19, 20, 21 or 22, wherein said ink sheet and said recording medium are conveyed by drive forces of discrete motors.

24. A thermal transfer recording method according to claims 19, 20, 21, or 22, wherein said ink sheet and said recording medium are conveyed by drive force of a common motor.

25. A thermal transfer recording method according to claims 19, 20, 21, or 22, wherein the ink of said ink sheet is heat-meltable.

26. A thermal transfer recording method according to claims 19, 20, 21, or 22, wherein the ink of said ink sheet is heat-sublimating.

27. A thermal transfer recording method according to claims 19, 20, 21, or 22, wherein said ink sheet has an amount of ink enabling plural times of image recording.

28. A thermal transfer recording method according to claims 19, 20, 21 or 22, wherein a relative velocity of said recording medium and said ink sheet is equal to or greater than a conveying velocity of said recording medium or said ink sheet.

29. A thermal transfer recording method according to claims 19 or 20, wherein said direction of image recording is opposite to a direction of movement of said recording medium.

30. A thermal transfer recording apparatus according to claim 19 or 20, wherein said direction of recording an image on said recording medium is consistent with a direction of successive recording by a serial head.

31. A thermal transfer recording method according to claims 19 or 20, wherein said ink sheet is of a narrow width and is of a serial type which is sequentially displaced along an image recording area to effect image recording.

* * * * *

UNITED STATES PATENT AND TRADEMARK OFFICE

CERTIFICATE OF CORRECTION

PATENT NO. : 5,193,007

DATED : March 9, 1993

INVENTOR(S) : MINORU YOKOYAMA ET AL.

It is certified that error appears in the above-identified patent and that said Letters Patent is hereby corrected as shown below:

ON THE TITLE PAGE:

AT [75] INVENTORS

"Makoto Kobayashi, Iama" should read --Makoto Kobayashi, Tama--.

Signed and Sealed this

First Day of February, 1994

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,193,007

DATED : March 9, 1993

INVENTOR(S) : MINORU YOKOYAMA, ET AL.

It is certified that error appears in the above-identified patent and that said Letters Patent is hereby corrected as shown below:

On title page,

IN [56] REFERENCES CITED

Under FOREIGN PATENT DOCUMENTS:

| | | | |
|---|---|---|---|
| "201686 | 11/1983 | Japan . | |
| 95177 | 6/1984 | Japan . | |
| 165169 | 7/1988 | Japan . | |
| 21479 | 1/1991 | Japan ." | should read |

| | | |
|---|---|---|
| --58-201686 | 11/1983 | Japan . |
| 59-95177 | 6/1984 | Japan . |
| 63-165169 | 7/1988 | Japan . |
| 3-21479 | 1/1991 | Japan .--. |

COLUMN 4

Line 41, "(NCU)." should read --(NCU),--.

COLUMN 8

Line 17, "dots" should read --dots.--.

UNITED STATES PATENT AND TRADEMARK OFFICE
CERTIFICATE OF CORRECTION

PATENT NO. : 5,193,007

DATED : March 9, 1993

INVENTOR(S) : MINORU YOKOYAMA, ET AL.

It is certified that error appears in the above-identified patent and that said Letters Patent is hereby corrected as shown below:

COLUMN 16

Line 8, "claim 1," should read --claims 1,-- and "5" should read --5,--.
Line 32, "claims 4," should read --claims 1, 4,--.
Line 36, "claims 4," should read --claims 1, 4,--.

Signed and Sealed this

Twenty-sixth Day of July, 1994

Attest:

BRUCE LEHMAN

Attesting Officer

Commissioner of Patents and Trademarks